United States Patent

Uchiyama

[15] 3,699,466

[45] Oct. 17, 1972

[54] SINGLE ENDED PUSH-PULL AMPLIFIER

[72] Inventor: Yasuji Uchiyama, Hamakita, Japan

[73] Assignee: Nippon Gakki Seizo Kabushiki Kaisha, Hamamatsu-shi, Japan

[22] Filed: Feb. 17, 1971

[21] Appl. No.: 115,991

[30] Foreign Application Priority Data

Feb. 26, 1970 Japan ......................45/16554

[52] U.S. Cl. ........................330/15, 330/18, 330/22, 330/23

[51] Int. Cl. ......................................................H03f

[58] Field of Search......................330/15, 18, 23, 22

[56] References Cited

UNITED STATES PATENTS

| | | | |
|---|---|---|---|
| 3,234,479 | 2/1966 | Shimada et al. | 330/18 |
| 3,050,644 | 8/1962 | Ironside | 330/23 |

*Primary Examiner*—Roy Lake
*Assistant Examiner*—Lawrence J. Dahl
*Attorney*—Flynn & Frishauf

[57] ABSTRACT

In order to facilitate bias adjustment in a single ended push-pull amplifier comprising first and second transistors connected in series between a power source and the ground, a circuit including a capacitor and load connected in series between the juncture of the first and second transistors and the ground, at least one circuit including of a plurality of resistors, one resistor being a variable one, connected in series between the power source and the ground so as to supply bias voltage to the first and second transistors, and an input transformer having first and second secondary windings so as to actuate upon receipt of signals the first and second transistors alternately; there is connected a DC blocking capacitor between the bias voltage supplying point included in the aforesaid resistor series circuit to the first transistor and the juncture of the first and second transistors, and voltage across the variable resistor included in the series circuit is supplied to the second transistor as bias voltage. The single variable resistor adjusts the proper operating condition.

10 Claims, 4 Drawing Figures

PATENTED OCT 17 1972 3,699,466

SINGLE ENDED PUSH-PULL AMPLIFIER

BACKGROUND OF THE INVENTION

The present invention relates to a single ended push-pull amplifier and more particularly to the bias circuit of a single ended push-pull amplifier having an input transformer.

Generally, a single ended push-pull amplifier with an input transformer comprises: a pair of transistors of the same polarity type (N-P-N or P-N-P) connected in series between a power source and the ground; a circuit including a capacitor and a load, that is, a loud-speaker connected in series between the juncture of both transistors and the ground; and a bias circuit including a first fixed resistor, a first variable resistor, a second fixed resistor and a second variable resistor all connected in series in the order given above between the power source and the ground. The juncture of the first variable resistor and second fixed resistor is directly connected to the juncture of both transistors. The juncture of the first fixed resistor and first variable resistor is connected to the base of a first one of the two transistors through a first output winding included in an input transformer. The juncture of the second fixed resistor and second variable resistor is connected to the base of a second transistor through a second output winding. The first and second output windings are electromagnetically coupled to a common input winding and constructed to obtain signals differed 180° in phase from each other. As is well known, when the input winding is impressed with signals, the paired transistors are actuated per half period of the signals, obtaining amplified output in a load circuit.

A pair of transistors included in such single ended push-pull amplifier each constitute a Class B amplifier. In the absence of signals, therefore, voltage at the juncture of the paired transistors should theoretically be equal to half the supply voltage. On the other hand, where there is no supply of signals, very minute amounts of idling current are required to flow across both transistors by the bias circuit in order to eliminate cross-over distortions resulting from a non-linear relationship between the voltage $V_{be}$ across the base and emitter of the transistor and the collector current $I_C$.

With a single ended push-pull amplifier, therefore, it is necessary to adjust the voltage at the juncture of the paired transistors to half the supply voltage and non-signal current to a prescribed value by means of two variable resistors included in the bias circuit. If, in this case, the idling current is controlled to a prescribed level by adjusting one of the two variable resistors, then voltage at the juncture of the paired transistors will be displaced from the level of half the supply voltage. If voltage at the juncture of the paired transistors is controlled to half the supply voltage by the other variable resistor, then the idling current will depart from a prescribed level. This is due to the fact that the juncture of the paired transistors is directly connected to the juncture of the first variable resistor and second fixed resistor. Accordingly, bias control of voltage at the juncture of the paired transistors and idling current respectively to a prescribed level should be performed in interrelationship of the two variable resistors. However, this operation is so complicated as to demand advanced skill.

SUMMARY OF THE INVENTION

It is accordingly the object of the present invention to provide a single ended push-pull amplifier which facilitates bias control and always ensures a stable biased condition.

According to an aspect of the present invention, there is provided a single ended push-pull amplifier comprising first and second transistors connected in series between a power source and the ground; a circuit including a capacitor and a load connected in series between the juncture of the first and second transistors and the ground; at least one circuit including a plurality of resistors, one resistor being a variable one, connected in series between the power source and the ground; an input transformer having a common primary winding and first and second secondary windings for actuating upon receipt of signals the first and second transistors alternately; and a capacitor connected between the bias voltage supplying point to one of the transistors included in the resistor series circuit and the juncture of the first and second transistors.

DESCRIPTION OF THE PREFERRED EMBODIMENTS

Figures 1, 2, 3, 4:
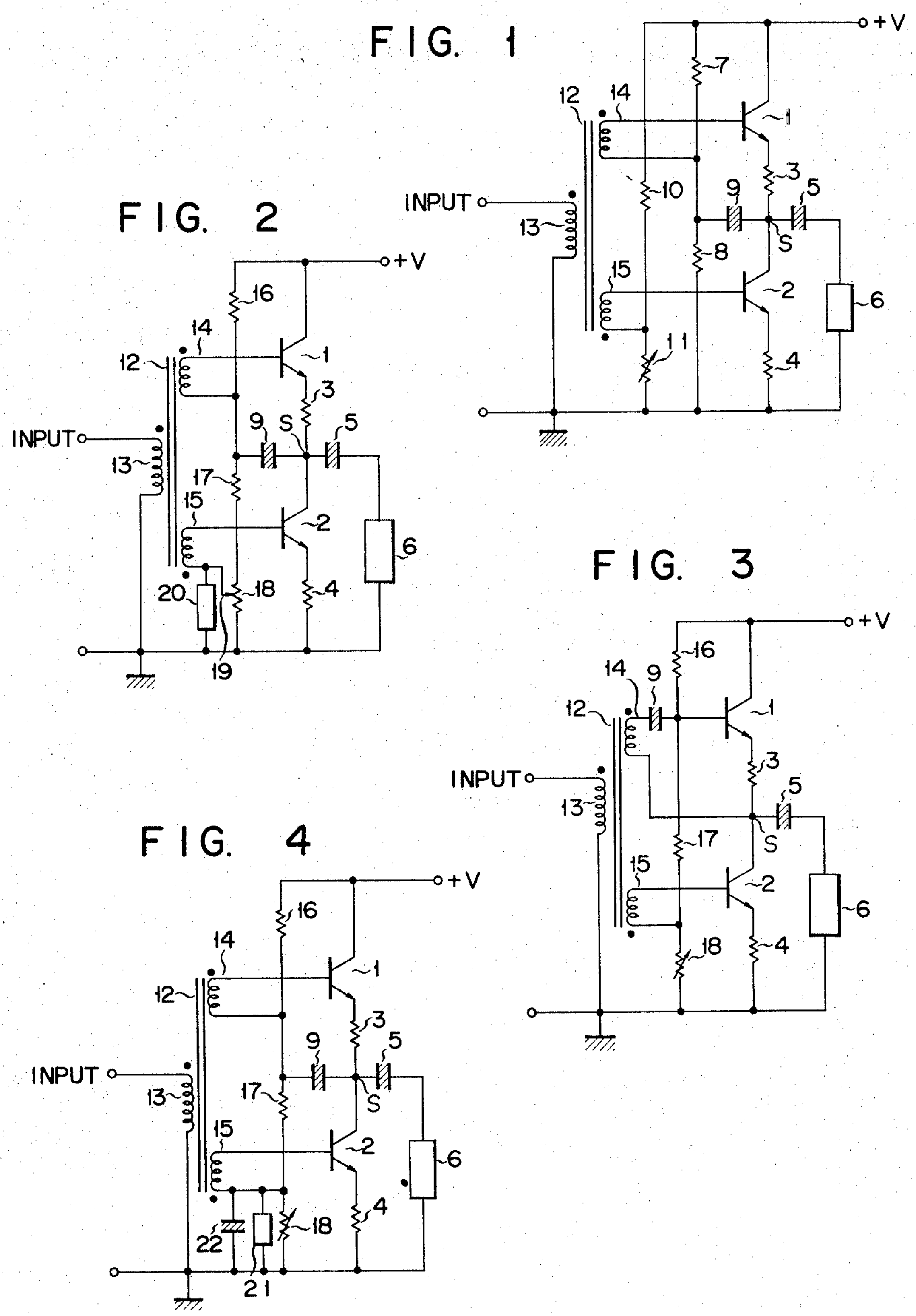
FIG. 1 is a circuit diagram of a single ended push-pull amplifier according to one embodiment of the present invention.
FIG. 2 is a circuit diagram of another embodiment of the invention.
FIG. 3 is a modification of FIG. 2.
FIG. 4 is another modification of FIG. 2.

Referring now to FIG. 1, the collector of a first transistor 1, for example of NPN type, is connected to supply voltage and the emitter of transistor 1 is connected through a resistor 3 to the collector of a second NPN type transistor 2. The emitter of transistor 2 is grounded through a resistor 4. Between the juncture S (hereinafter referred to as an "output point") of the resistor 3 with the collector of the second transistor 2 and the ground is connected a circuit including a capacitor 5 and a load, that is, a loudspeaker 6. Between the power source and the ground is connected a first circuit including fixed resistors 7 and 8 connected in series. Between the juncture of the resistors 7 and 8 and the output point S is connected a DC blocking capacitor 9. Between the power source and the ground is further connected a second circuit including a fixed resistor 10 and a variable resistor 11 connected in series.

There is further provided an input transformer 12 having an input winding, that is, primary winding 13 and first and second output windings, that is, secondary windings 14 and 15. The primary winding 13 is supplied with signals at one end and grounded at the other. One end of the first secondary winding 14 is connected to the base of transistor 1 and the other end to the juncture of resistors 7 and 8 included in the first series circuit. One end of the second secondary winding 15 is connected to the base of transistor 2 and the other end to the juncture of fixed resistor 10 and variable resistor 11 included in the second series circuit.

The first and second secondary windings 14 and 15 are turned in opposite directions, so that upon application of signals to the primary winding 13, voltages appearing in the secondary windings 14 and 15 are 180° out-of-phase. The first and second transistors 1 and 2 are actuated alternately per half period of signals applied.

There will now be described by reference to FIG. 1 the bias circuit of a single ended push-pull amplifier according to an embodiment of the present invention. Assuming that the resistors 7 and 8 included in the first series circuit have an equal resistance, it is obvious that the voltage at their juncture will be half the supply voltage. In case the transistors 1 and 2 are silicon transistors, the voltage $V_{be}$ across base-emitter junction upon conduction will be about 0.6 to 0.7 volt and the resistance of the resistors 3 and 4 will be about 0.5 to 1 ohm. If, therefore, the base current of transistor 1 is much smaller than the current passing through the resistors 7 and 8, then voltage at the output point S will be maintained at substantially half the supply voltage, though there may occur some fluctuations in the current flowing through the resistor 3.

Since voltage across the variable resistor 11 included in the second series circuit is supplied to the base-emitter diode of transistor 2, the idling current in the transistors 1 and 2 may be adjusted to any desired level by varying the resistance of variable resistor 11. As is apparent from the foregoing description, control of the idling current will not affect voltage at the output point S.

While, in the embodiment of FIG. 1, two circuits each including a plurality of resistors connected in series were used as bias circuits, the object of the present invention may also be attained by a single bias circuit of such type as illustrated in FIG. 2. The same parts of FIG. 2 as those of FIG. 1 are denoted by the same numerals and description thereof is omitted. The bias circuit includes fixed resistors 16 and 17 and variable resistor 18 connected in series between the power source and ground. In this case, the DC blocking capacitor 9 is connected between the juncture of the resistors 16 and 17 and the output point S. The first secondary winding 14 is connected between the base of transistor 1 and the juncture of the resistors 16 and 17. On the other hand, the second secondary winding 15 is connected between the base of transistor 2 and a wiper arm 19 constituting one terminal of the variable resistor (potentiometer type) 18. Further between the wiper arm 19 of the variable resistor 18 and the ground is connected a bias stabilizing element 20 including a diode in the forward direction with respect to the supply voltage.

If, in the embodiment of FIG. 2, the resistor 16 has the same resistance as those of the resistor 17 and variable resistor 18 put together, then voltage at the output point S will be equal to half the supply voltage as in FIG. 1. An idling current in the transistor 2 can also be controlled by adjusting the variable resistor 18 as in FIG. 1. When a change in the supply voltage tends to vary the bias voltage impressed on the transistor 2 through the wiper arm 19 of the variable resistor 18 and in consequence the idling current, this event will be obstructed by the constant voltage characteristics of the stabilizing element 20.

FIG. 3 is a modification of FIG. 2. The same parts of FIG. 3 as those of FIG. 2 are denoted by the same numerals. In this case, the base of transistor 1 is connected to the juncture of the resistors 16 and 17. The DC blocking capacitor 9 is connected between the base of transistor 1 and one end of the first secondary winding 14, the other end of which is directly connected to the output point S. On the other hand, the second secondary winding 15 is connected between the base of transistor 2 and the juncture of the resistor 17 and variable resistor 18. In the case of FIG. 3, if adjustment of the variable resistor 18 results in variation in the base voltage of the transistor 1 and in consequence voltage at the output point S, voltage across the variable resistor 18 for controlling idling current will only present such small changes as to have substantially no effect on the base voltage of the transistor 1.

FIG. 4 is another modification of FIG. 2. In this case there are connected a thermistor 21 and a capacitor 22 across the variable resistor 18. The capacitor 22 has the same capacity as the capacitor 9 and is intended to balance the low frequency characteristics of the transistor 1 as an amplifier with those of the transistor 2. Signal current supplied to the transistor 1 passes through the base-emitter diode thereof, resistor 3 and capacitor 9. Accordingly, amplification by the transistor 1 is subject to a decline in its low frequency characteristics caused by the capacitor 9. Therefore, to allow the transistor 2 to have the same low frequency characteristics as those presented by the transistor 1 in amplification, it is preferred that there be provided the capacitor 22 in a signal current path with respect to the transistor 2.

The thermistor 21 is further provided to prevent variation in idling current caused by temperature change. The transistor is known to have increased idling current with temperature rise. If idling current is displaced from a prescribed level in a single ended push-pull amplifier, then there will occur signal distortions. A thermistor is reduced in resistance as temperature increases. If, therefore, the thermistor 21 is connected in parallel with the variable resistor 18, then the bias resistance will progressively decrease with temperature rise to cause the bias voltage across the base-emitter diode of transistor 2 to drop and in consequence prevent idling current from being increased due to temperature rise. It will be apparent that a decrease in idling current caused by temperature drop can be prevented in the same way.

What is claimed is:

1. A single ended push-pull amplifier comprising:
first and second transistors connected in series between a power source and ground potential;
an output circuit including a capacitor and a load connected in series between the juncture of said first and second transistors and ground potential;
a bias circuit including first, second and third series connected resistances, at least said third resistance being variable, said series connected resistances being coupled between the power source and ground potential;
an input transformer including a primary winding receiving input signals and first and second secondary windings coupled to said transistors to alternately operate said transistors upon receipt of said input signals; and
a capacitor connected between said bias circuit and the juncture of said first and second transistors;

said first and second resistances being connected directly to each other and the juncture of said first and second resistances being connected to the base of said first transistor through said first secondary winding and to the juncture of said first and second transistors through said capacitor, and one terminal of said third variable resistor being connected to the base of said second transistor through said secondary winding.

2. The amplifier according to claim 1 wherein said first and second resistances are fixed resistors.

3. The amplifier according to claim 1 wherein said bias circuit further comprises a bias stabilizing element including a diode between said one terminal and another terminal of said third variable resistor in the forward direction with respect to the supply voltage.

4. The amplifier according to claim 1 wherein said bias circuit further comprises an additional capacitor coupled between said one terminal and another terminal of said third variable resistor.

5. The amplifier according to claim 1 wherein said bias circuit further comprises a thermistor coupled between said one terminal and another terminal of said third variable resistor.

6. A single ended push-pull amplifier comprising:

first and second transistors connected in series between a power source and ground potential;

an output circuit including a capacitor and a load connected in series between the juncture of said first and second transistors and ground potential;

a bias circuit including first, second and third series connected resistances, at least said third resistance being variable, said series connected resistances being coupled between the power source and ground potential;

an input transformer including a primary winding receiving input signals and first and second secondary windings coupled to said transistors to alternately operate said transistors upon receipt of said input signals; and a capacitor connected between said bias circuit and the juncture of said first and second transistors;

said first and second resistances being connected directly to each other and the juncture of said two fixed resistors being connected directly to the base of said first transistor and also to the juncture of said first and second transistors through the series connection of said capacitor and said first secondary winding.

7. The amplifier according to claim 6 wherein said first and second resistances are fixed resistors.

8. The amplifier according to claim 6 wherein said bias circuit further comprises a bias stabilizing element including a diode between said one terminal and another terminal of said third variable resistor in the forward direction with respect to the supply voltage.

9. The amplifier according to claim 6 wherein said bias circuit further comprises an additional capacitor coupled between said one terminal and another terminal of said third variable resistor.

10. The amplifier according to claim 6 wherein said bias circuit further comprises a thermistor coupled between said one terminal and another terminal of said third variable resistor.

* * * * *